United States Patent [19]
Matzner et al.

[11] 3,718,672
[45] Feb. 27, 1973

[54] DISULFONAMIDES OF DIAMINO DIPHENYL SULFONES

[75] Inventors: Markus Matzner, Edison; Walter T. Reichle, Millington; Sui-Wu Chow; James E. McGrath, both of Somerville, all of N.J.

[73] Assignee: Union Carbide Corporation, New York, N.Y.

[22] Filed: April 6, 1970

[21] Appl. No.: 26,045

[52] U.S. Cl.............................260/397.6, 260/78 L
[51] Int. Cl..............................................C07c 143/74
[58] Field of Search..................................260/397.6

[56] References Cited

OTHER PUBLICATIONS

JACS, Vol. 67: 1979, 1980, 1983, 1984, 1988 (1945) Heymann et al.

Primary Examiner—John D. Randolph
Assistant Examiner—S. D. Winters
Attorney—Paul A. Rose, Aldo J. Cozzi, Gerald R. O'Brien, Jr. and James J. O'Connell

[57] ABSTRACT

Compounds of the structure

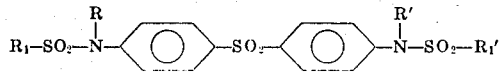

wherein R, R', $R_1$ and $R_1'$ are $C_1$ to $C_{20}$ hydrocarbon radicals. These compounds are useful as initiators or activators in the anionic polymerization of lactam monomers.

4 Claims, No Drawings

DISULFONAMIDES OF DIAMINO DIPHENYL SULFONES

BACKGROUND OF THE INVENTION

1. Field of the Invention

The invention relates to novel disulfonamide derivatives of N, N' substituted diamino diphenyl sulfones.

2. Description of the Prior Art

Certain diamino diphenyl sulfone derivatives, including certain diamides, have been prepared as disclosed in the Journal of the American Chemical Society, Volume 67, pages 1979 to 1990 (1945). The thus disclosed compounds were evaluated for biological activity.

Although the $SO_2$ group which links the phenyl radicals in this type of sulfone compound also tends to activate the entire compound for various types of chemical reactions, it has been found that the diamine compounds, as well as the bis(acetamide) and bis (benzamide) derivatives of the diamine compounds are not active enough to be used as initiators in the anionic polymerization of lactam monomers.

Attempts to use acetanilide as an initiator for the anionic polymerization of ε-caprolactam were also unsuccessful, Am. Chem. Soc., Div. Polym. Chem., Preprints 9 (1), at page 394, (1968).

SUMMARY OF THE INVENTION

Certain disulfonamide derivatives of N, N' substituted diamino diphenyl sulfone compounds are provided as novel compounds which are useful as initiators in the anionic polymerization of lactam monomers.

An object of the present invention is to provide for a novel class of derivatives of diamino diphenyl sulfone compounds.

A further object of the present invention is to provide compounds which may be useful as initiators or activators in the anionic polymerization of the lactam monomers.

DESCRIPTION OF THE PREFERRED EMBODIMENT

The novel compounds of the present invention have the structure

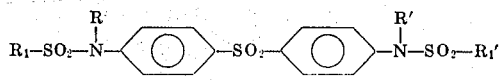

wherein R, R', $R_1$ and $R'_1$ are the same or different $C_1$ to $C_{20}$, inclusive, hydrocarbon radicals.

The R, R', $R_1$ and $R'_1$ radicals may be saturated or unsaturated. Such radicals would include aliphatic, alicyclic and aromatic radicals such as methyl, ethyl, propyl, butyl, cycloheptyl, cyclohexyl, allyl, propeneyl, hexadienyl, octadienyl, phenyl, benzyl and naphthyl radicals.

The R, R', $R_1$ and $R'_1$ radicals may also be substituted with one or more inert substituent radicals. The inert substituent radicals are those which are capable of being substituted on the R, R', $R_1$ and $R'_1$ hydrocarbon radicals and which are inert to the components of the reaction systems in which the novel compounds of the present invention are formed, as well as to the basic components of the lactam polymerization systems in which they may be employed, i.e., the lactam monomer and the anionic polymerization catalyst.

The preferred R, R', $R_1$ and $R'_1$ radicals are methyl, ethyl, propyl, phenyl and naphthyl radicals.

PREPARATION OF THE NOVEL COMPOUNDS

The novel compounds of the present invention are prepared by reacting a diamine compound having the structure

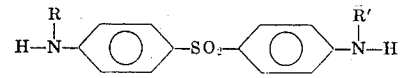

wherein R and R' are as defined above, with one or more sulfonyl compound having the structure

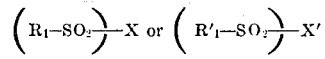

wherein $R_1$ and $R'_1$ are as defined above, and X and X' are the same or different radicals and are OH or halogen radicals, to form the desired disulfonamide compounds, with water or halogen acid being formed as a by-product, depending on whether X and X' are OH or halogen, respectively.

The preferred sulfonyl compounds for the purposes of the present invention are the sulfonyl halides, notably the sulfonyl chlorides. At least 2 moles of the sulfonyl halide are used per mole of the diamine compound. When the sulfonyl halides are used as the sulfonyl compounds the reaction is preferably conducted in a halogen acid accepting solvent such as pyridine, alkyl substituted pyridines and triethylamine. At least 1 mole of the solvent is used per mole of halogen acid formed in the reaction. Excess solvent may be used for diluent purposes.

When water is a by-product, the reaction system preferably contains mechanical or chemical means for effectively removing the water so that the reaction may be driven to completion.

The use of different sulfonyl compounds which contain different $R_1$ and $R'_1$ radicals could result in the preparation of disulfonamides having unsymmetrical structures.

The reaction is conducted at atmospheric pressure and at temperatures of about 80° to 200° C. The preferred temperature is the reflux temperature of the mixture of the components of the reaction system. The reaction may be run under an inert blanket of a moisture free gas such as nitrogen. The reaction is usually conducted for a period of up to about 24 hours.

The disulfonamide compounds of the present invention are crystalline materials which may be readily recovered from the reaction systems in which they are prepared by precipatation with water or by extraction with solvents such as chloroform followed by crystallization from appropriate solvents such as chloroform, aqueous ethanol or aqueous acetone.

The following examples are merely illustrative of the present invention and are not intended as a limitation upon the scope thereof.

EXAMPLE 1

Preparation of N, N'-dimethylsulfonyl-N,N'-dimethyl-4,4'-diamino diphenyl sulfone, i.e.,

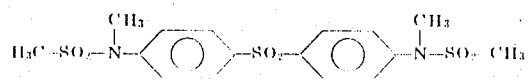

A solution of 33 g. (0.4 mole) of methanesulfonyl chloride in 50 ml. of pyridine was added dropwise to a solution of 27.6 grams (0.1 mole) of bis(N-methyl-p-aminophenyl)sulfone in 100 ml of pyridine over a period of about 15 minutes. After the mild exotherm subsided, the mixture was heated at reflux for 22 hours. The reaction mixture was poured into water and the precipitated product was washed with water and recrystallized from chloroform. There was obtained 24.5 g. of the desired sulfonamide which had a melting point of 213°–215° C.

Anal: Calc. for $C_{16}H_{20}N_2O_6S_3$: C, 44.43; H, 4.60; N, 6.48; S, 22.23

Found : C, 43.92; H, 4.37; N, 6.34; S, 22.38.

EXAMPLE 2

Polymerization of ε-caprolactam using the diamide compound prepared as in Example 1 as an anionic polymerization initiator.

Into each of two 25 × 200 mm test tubes was added 28.3 g. (0.25 mole) of molten caprolactam, and both were then heated at a polymerization temperature of 160° C. Two mol percent of a catalyst, sodium hydride, in the form of a dispersion (57 percent) in oil was added to one of these test tubes, while 1.0 mol percent of the initiator was added to the other. After solutions were formed and equilibrated with the bath temperature, they were mixed and then heated at the 160° C. polymerization temperature. The progress of the polymerization was followed visually. The time required for the development of opacity was taken as the time required for crystallization of the Nylon 6 formed.

The crystallization time for the polymerization system was 53 minutes.

What is claimed is:

1. A compound having the structure:

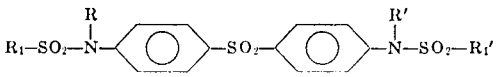

wherein R, R', $R_1$ and $R'_1$ are the same or different $C_1$ to $C_{20}$, inclusive, aliphatic and alicyclic hydrocarbon radicals.

2. A compound as in claim 1 wherein R = R' and $R_1$ = $R'_1$.

3. A compound as in claim 1 wherein R = R' = $CH_3$.

4. A compound as in claim 3 which is N,N'-dimethyl sulfonyl-N,N'-dimethyl-4,4'-diamino diphenyl sulfone.

* * * * *